US009092781B2

(12) United States Patent
Schultz

(10) Patent No.: US 9,092,781 B2
(45) Date of Patent: Jul. 28, 2015

(54) METHODS AND SYSTEMS FOR SECURE VOICE-AUTHENTICATED ELECTRONIC PAYMENT

(75) Inventor: Paul T. Schultz, Colorado Springs, CO (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 228 days.

(21) Appl. No.: 11/769,295

(22) Filed: Jun. 27, 2007

(65) Prior Publication Data

US 2009/0006264 A1    Jan. 1, 2009

(51) Int. Cl.
| | | |
|---|---|---|
| G06Q 20/00 | (2012.01) | |
| G06Q 20/40 | (2012.01) | |
| G06Q 20/36 | (2012.01) | |
| G10L 17/00 | (2013.01) | |
| G06Q 20/34 | (2012.01) | |
| G07F 7/10 | (2006.01) | |

(52) U.S. Cl.
CPC ........ *G06Q 20/4014* (2013.01); *G06Q 20/3674* (2013.01); *G06Q 20/40* (2013.01); *G06Q 20/40145* (2013.01); *G10L 17/00* (2013.01); *G06Q 20/341* (2013.01); *G07F 7/1008* (2013.01)

(58) Field of Classification Search
CPC .................................................. G06Q 20/4014
USPC ...................................................... 705/50–79
See application file for complete search history.

(56) References Cited

U.S. PATENT DOCUMENTS

| | | | |
|---|---|---|---|
| 6,847,816 B1 * | 1/2005 | Sarradin ....................... 455/407 |
| 6,934,849 B2 * | 8/2005 | Kramer et al. ................ 713/186 |
| 7,014,107 B2 | 3/2006 | Singer | |
| 7,103,576 B2 | 9/2006 | Mann | |
| 7,158,955 B2 | 1/2007 | Diveley | |
| 7,174,323 B1 | 2/2007 | Schultz | |
| 7,240,036 B1 * | 7/2007 | Mamdani et al. ............... 705/75 |
| 7,278,028 B1 * | 10/2007 | Hingoranee .................. 713/186 |
| 7,360,694 B2 * | 4/2008 | Wankmueller ................ 235/382 |
| 2002/0026478 A1 * | 2/2002 | Rodgers et al. ............... 709/205 |
| 2004/0243514 A1 * | 12/2004 | Wankmueller .................. 705/40 |
| 2006/0129504 A1 * | 6/2006 | Nakajima ....................... 705/75 |
| 2006/0188076 A1 * | 8/2006 | Isenberg .................... 379/88.02 |
| 2007/0027816 A1 * | 2/2007 | Writer ............................. 705/65 |
| 2009/0140839 A1 * | 6/2009 | Bishop et al. ................ 340/5.85 |

OTHER PUBLICATIONS

Zhang, et al., "A Practical E-Payment Protocol to Realize Fair-Exchange", The Second International Conference on Mobile Technology, Applications and Systems (IEEE Mobility Conference 2005), Springer Verlag (LNCS), The ISG-Smart Card Centre, Founded by Vodafone, G&D and the Information Security Group, Royal Holloway, University of London, Egham, Surrey, TW20 0EX, UK.
Belgium eyes world first with text message payments—Mobiles & Handhelds.htm, printed on Apr. 9, 2007.

* cited by examiner

*Primary Examiner* — Calvin L Hewitt, II
*Assistant Examiner* — Margaret Neubig

(57) ABSTRACT

This application discloses systems, methods, and processes for providing a secure, voice-authenticated form of electronic payment from a device. The described exemplary system provides an infrastructure for receiving an electronic payment request, verifying the request using voice authentication, and allowing or denying the request based on the authentication or non-authentication of the user.

6 Claims, 4 Drawing Sheets

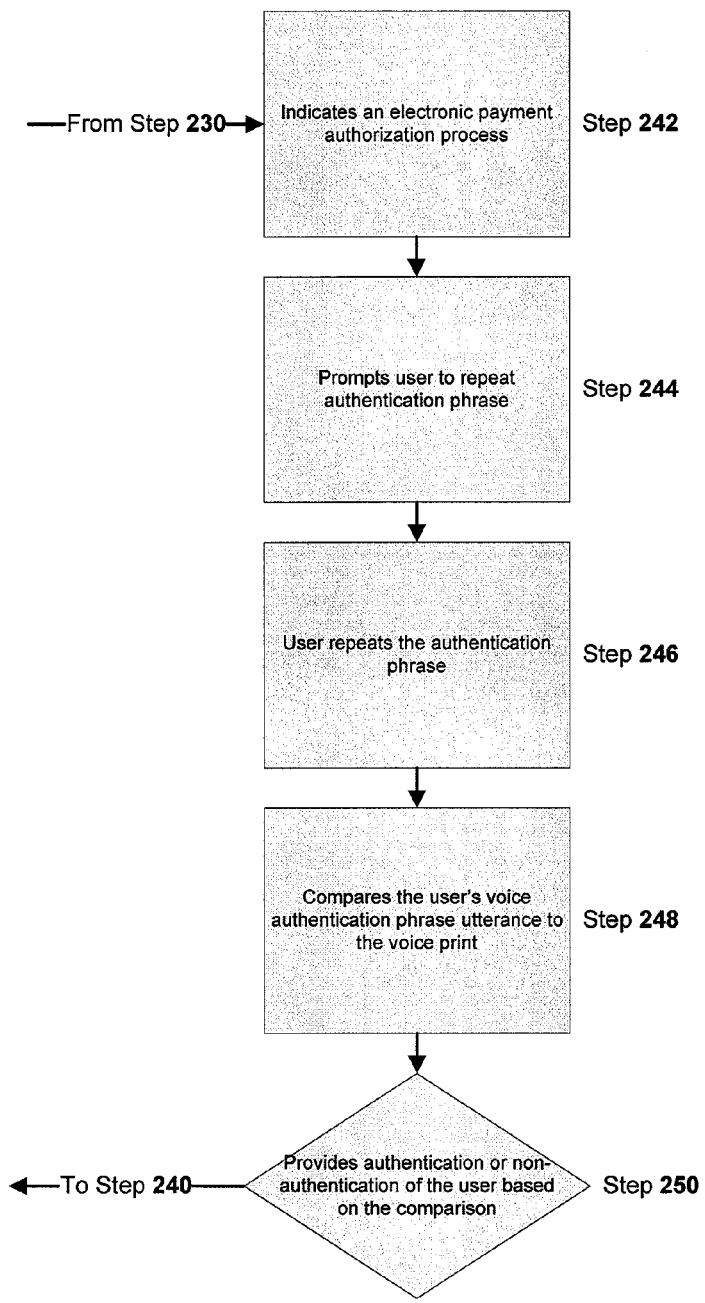

METHODS AND SYSTEMS FOR SECURE VOICE-AUTHENTICATED ELECTRONIC PAYMENT

BACKGROUND OF THE INVENTION

As growth in the technological sector has continued, societies have become more mobile. For example, people commonly have cellular phones, pagers, messaging devices, personal digital assistants (PDAs), pocket computers and the like. These devices aid work-related productivity and provide personal conveniences.

However, with the plethora of new wireless devices, there is a growing call for consolidation. That is, users desire to have many services and applications consolidated into a single device. As a result, a single device may now provide many functions such as email access, phone access, games, calculator functions, calendar functions, contact lists, and alarms. However, mobile devices of today typically do not enable users to complete secure transactions (e.g., to pay for goods and services).

BRIEF DESCRIPTION OF THE SEVERAL VIEWS OF THE DRAWINGS

FIGS. 3 and 4 show an exemplary voice-authenticated electronic payment transaction.

DETAILED DESCRIPTION

Figure 1:
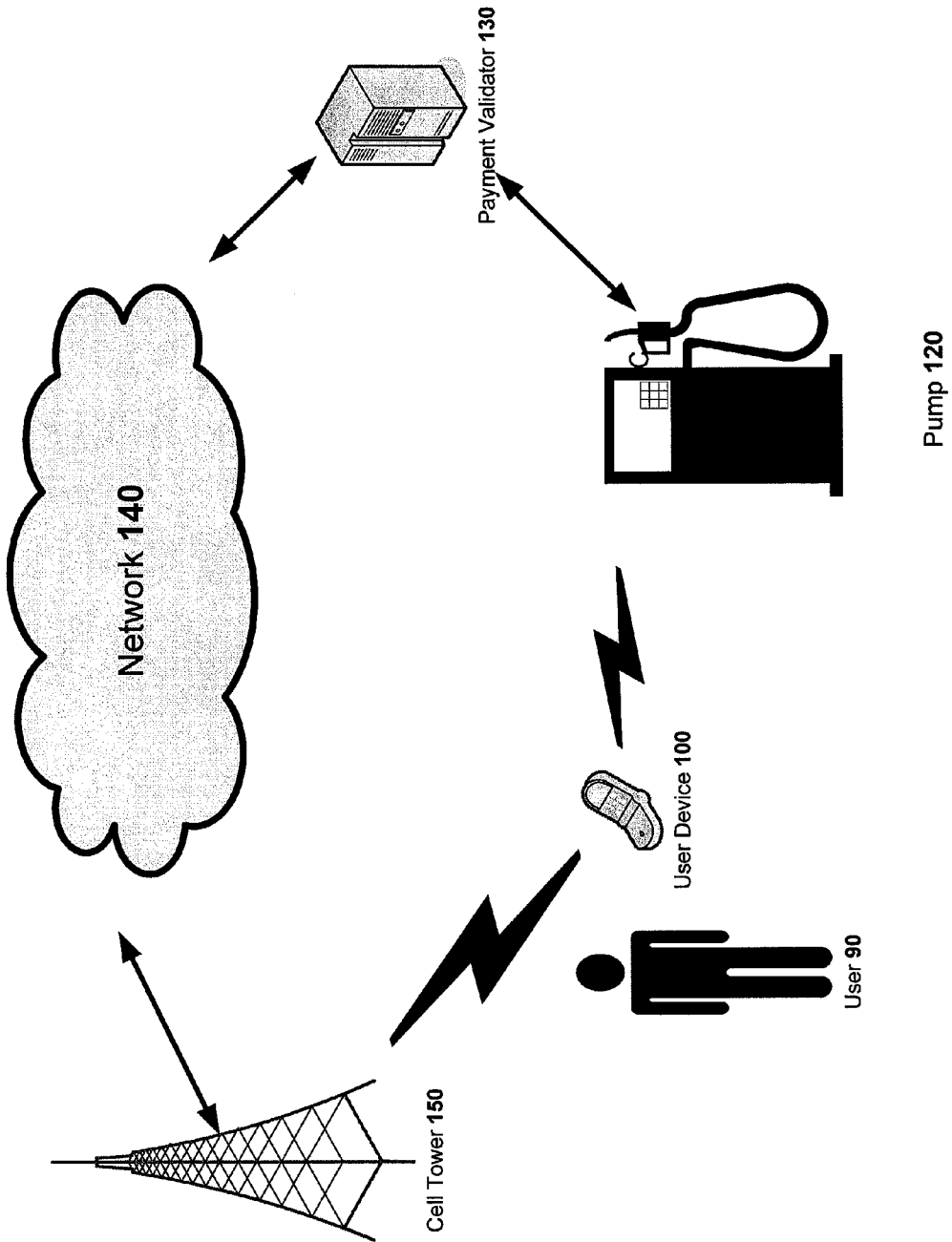
FIG. 1 shows an exemplary system for carrying out voice authenticated electronic payments.
Figure 2:
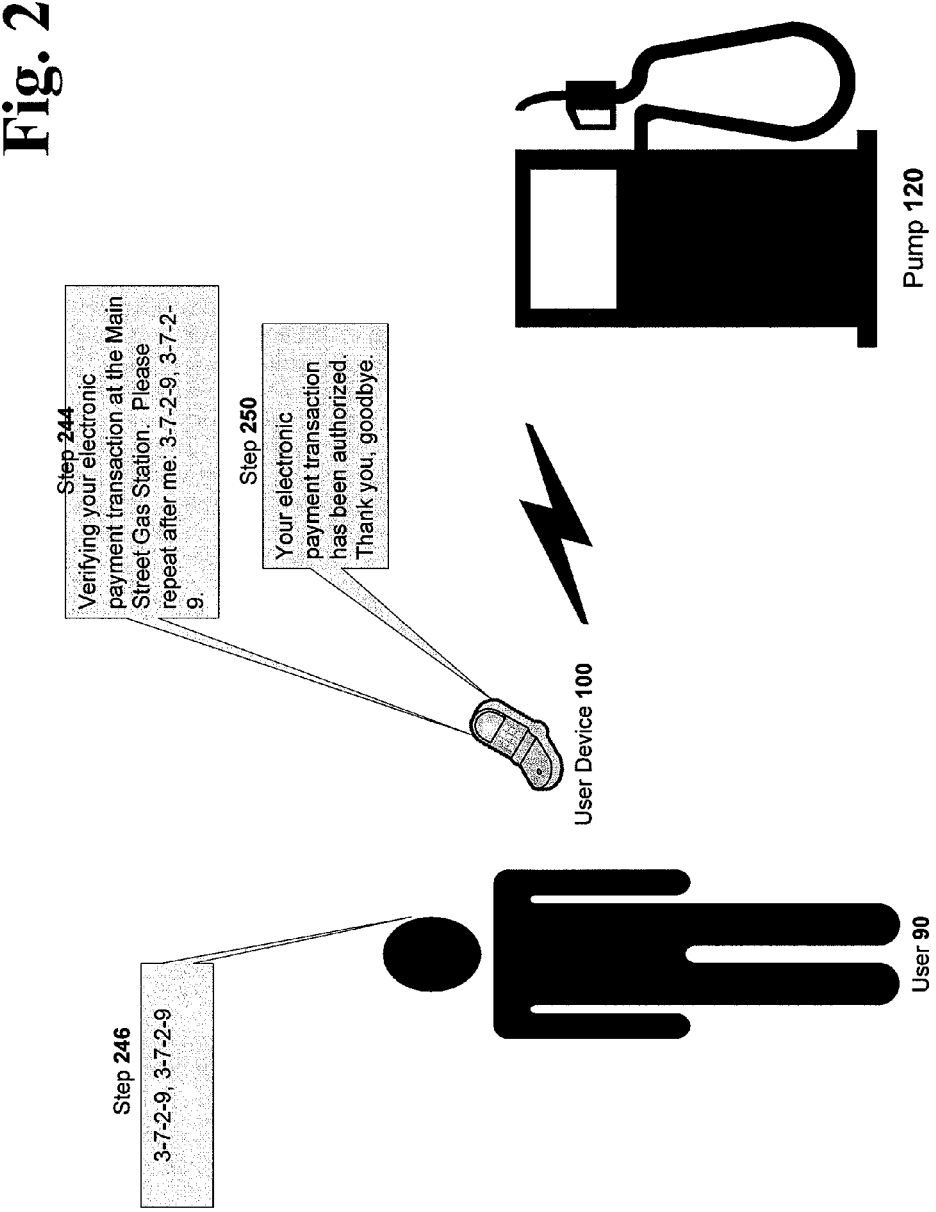
FIG. 2 shows an exemplary embodiment of communication between a user and a payment validator.
Figure 3:
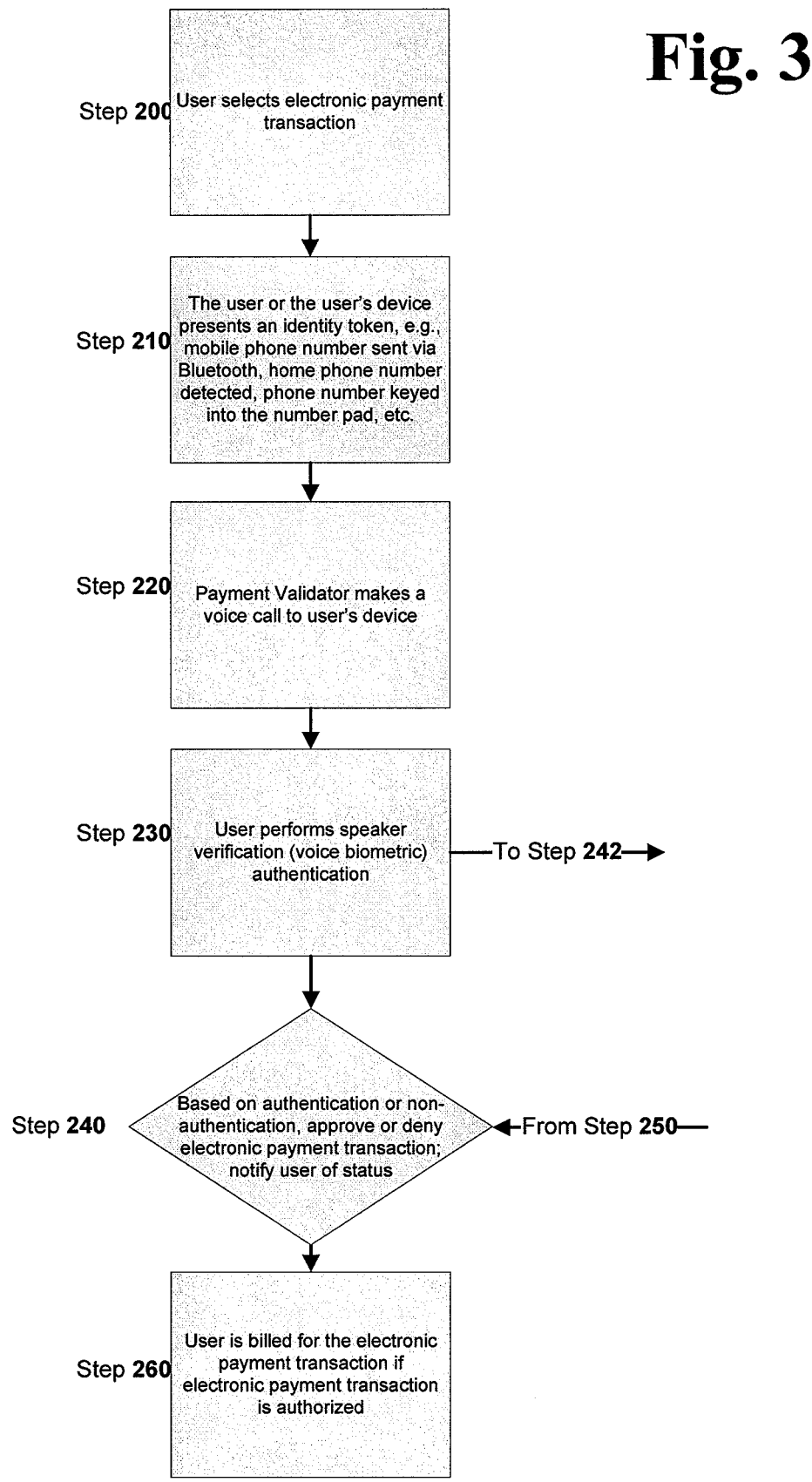

Exemplary embodiments are described hereinafter with reference to the accompanying drawings, in which exemplary embodiments and examples are shown. Like numbers refer to like elements throughout.

As will be appreciated, exemplary embodiments may be implemented as a method, a data processing system, or a computer program product. Accordingly, the exemplary embodiments may take the form of an entirely hardware embodiment, an entirely software embodiment, or an embodiment combining software and hardware aspects. Furthermore, the various implementations may take the form of a computer program product on a computer-readable storage medium having computer-readable program instructions (e.g., computer software) embodied in the storage medium. More particularly, implementations of the exemplary embodiments may take the form of web-implemented computer software. Any suitable computer-readable storage medium may be utilized including hard disks, CD-ROMs, optical storage devices, or magnetic storage devices.

The exemplary embodiments are described below with reference to block diagrams and flowchart illustrations of methods, apparatuses (i.e., systems), and computer program products. It should be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Exemplary System Architecture

FIG. 1 provides an overview of one embodiment for providing a secure method, data processing system, or computer program product for a voice authenticated electronic payment transaction from a user device 100 using a payment validator 130. Although, the payment validator 130 in FIG. 1 is depicted as outside the network 140, it is often in fact deployed within network 140. Thus, this figure is illustrative and not limiting to the various embodiments. FIG. 1 also depicts a mobile device; however, the embodiments are not limited exclusively to mobile devices. The term "user device" is used generically to include both mobile devices and fixed devices. In fact, a landline device or other device can be used to implement the systems, methods, and computer program products described.

The terms "mobile device," "landline device," "user device," and "other device" can be a cellular phone, PDA, handheld device, computer, laptop, landline telephone, or any other device configured to perform the functions described herein. These devices typically communicate with external communication networks using a communications controller. The external communication networks may interface with the communications controller using a wired data transmission protocol such as X.25, ISDN, DSL, PIP, Ethernet, ATM, frame relay, DOCSIS, or any other wired transmission protocol. Alternatively, the device may be configured to communicate via wireless external communication networks using a wireless protocol such as 802.11, 802.15.4, standard 3G, CDMA2000 1x EV-DO, GPRS, W-CDMA, or any other wireless protocol. One such device with which these devices may communicate is the payment validator 130.

The payment validator 130 receives requests for electronic payment transactions, executes a validation process using the user's 90 voice, and in turn either authorizes or denies each electronic payment request. Typically, the payment validator 130 includes a processor that communicates with memory that may store or function as a database which can be viewed as a form of secondary memory or primary memory. The payment validator 130 also contains memory. In one embodiment, the memory can be considered primary memory that is RAM or other forms which retain the contents only during operation, or it may be non-volatile, such as ROM, EPROM, EEPROM, FLASH, or other types of memory that retain the memory contents at all times. The memory could also be secondary memory, such as disk storage, that stores large amounts of data. The secondary memory may be a floppy disk, hard disk, compact disk, DVD, or any other type of mass storage. The processor also communicates with external devices via external and internal communications networks in the ways as previously discussed.

The payment validator 130 may reside on a single computer system, be executed via a distributed computer system, or even as a separate module such as an electronic payment validation module. For example, the payment validator 130 may consist of a network of clients and servers connected in such a way that the system communicates with various other systems. Moreover, these clients and servers might be in geographically diverse areas, connected by LAN, MAN, or WAN links. Moreover, the embodiments are not limited to one payment validator 130; rather, more than one payment validator 130 may be used. The payment validator 130 performs multiple functions that relate to receiving requests for electronic payment transactions, executing a validation process using the user's 90 voice, and either authorizing or denying the electronic payment request based on the validation.

Exemplary System Overview

In one embodiment, a user device 100 makes a request for an electronic payment transaction through a payment validator 130. The electronic payment transaction may be a payment transaction with a seller of goods, a provider of services, or any other transaction requiring payment. A user 90 is a human being operating a user device 100 associated with a particular account. In one embodiment, an account is the user's 90 wireless services account, e.g., cell phone or data services account. In another embodiment, an account is the user's 90 landline telephone account, e.g., home phone or business phone account. As will be recognized, the types of associated accounts may vary and are not limiting to the exemplary embodiments described herein.

In one embodiment, before the user 90 can successfully complete an electronic payment transaction using the user device 100, the user 90 first registers with the payment validator 130 and enroll a voice print. The voice print itself can be a biometric measurement of the user's 90 voice, i.e., a mathematical representation of the user's voice. The voice print can be converted into a digital template and stored on a server for convenient access for other programs.

In one embodiment, the user 90 calls a registration number to register and enroll the voice print. Upon calling the registration number, an automated attendant directs the user through a series of prompts to register and enroll the user's voice print. The voice print is then associated with the user's 90 account. In another embodiment, the user 90 logs onto a provider's website via a computing device and selects options that direct the user 90 to register and enroll the voice print, after which the voice print is associated with the user's 90 account. In one embodiment, the user 90 is asked to repeat a predefined expression, such as the numbers 0, 1, 2, 3, 4, 5, 6, 7, 8, 9 to create the voice print. In another embodiment, the user 90 is asked to repeat a series of words to create the voice print, e.g., "my name is Jon Doe." In a third embodiment, the user 90 is asked to repeat a specific pattern of numbers to create the voice print, e.g., 5-3-5-3-7-2-9 or 3-7-2-9, 3-7-2-9. As will be recognized, however, there are numerous other ways to enroll a voice print. After enrolling the voice print, the voice print is typically converted into a digital template and stored on a server. The voice print is not necessarily stored on one server, but it may be stored on many servers or in any other electronic storage medium. Moreover, the user 90 can register more than one voice print with an account or have more than one user 90 associated with a given account and thereby provide more than one voice print for an account.

In an exemplary embodiment, the electronic payment transaction is one in which the user 90 purchases gasoline using pay-at-the-pump options. The pay-at-the pump option the user 90 selects is the electronic payment option (step 200). The user device 100 or the user 90 then provides an identity token to the pump 120 identifying the user device 100 (step 210). The identity token can be any of a number of parameters, information, or data used to identify the user device 100. For example, in one embodiment, the user device 100 sends the mobile phone number associated with the user device 100 to the pump 120 via Bluetooth. In another embodiment, the user keys in the mobile phone number associated with the user device 100 into a keypad located on the pump 120. Other forms of communicating the device's identity will be recognized based on the nature of the transaction. For example, if one were initiating an electronic payment transaction from home using a personal computer, the computer's MAC address could be used. Similarly, if one were using a landline telephone to make the electronic payment, the telephone number could be used as the identity token (the identity token could even be automatically recognized in one embodiment by using current caller ID technology to identify the user device 100). In one embodiment, the identity token is communicated to the pump 120 and used to identify the user device 100. The pump 120 forwards the information relating to the identity token to the payment validator 130. That is, the payment validator 130 uses the identity token to identify the user device 100 and to call the user device 100 (step 220) to authenticate the user 90 and authorize or deny the electronic payment request.

As noted above, the payment validator 130 is typically some form of a computer or machine. Such a computer or machine may be, for instance, a mainframe, desktop, notebook or laptop, server, or it may be any other processing device. The computer may have a processor, such as a microprocessor, used to execute instructions for carrying out defined steps. The processor receives power from a power supply that also provides power to the other components as necessary. In one embodiment, the processor communicates using a data bus to convey data and program instructions, typically, between the processor and memory. Alternative embodiments of a payment validator 130 may be used such as a distributed communication and processing architecture. As will be recognized, many other alternatives and architectures are possible and can be used to practice the exemplary embodiments.

After receiving the identifying information, the payment validator 130 initiates a voice call (or voice session such as in Voice over IP) to the user device 100 (step 220). When the user 90 answers the call to the user device 100, the payment validator 130 indicates that the call is an electronic payment authorization call (step 242). This message indicates the reason for the call and provides instructions to the user 90 on how to proceed with the authorization. For instance, in one embodiment, the payment validator 130 communicates a voice message to the user device 100 that indicates "this call is for an electronic payment verification; we are verifying your electronic payment at the Main Street Gas Station; please repeat 3-7-2-9, 3-7-2-9" (steps 242 and 244). As will be recognized, the message prompts are not limiting; rather, the prompts may take many forms and be within the scope of the various embodiments. For instance, in another embodiment, the payment validator 130 requests the person answering the user device 100 to identify himself, e.g., "this call is for an electronic payment verification; please say your name." After identifying himself, Mr. Doe is then provided with instructions on how to proceed with the authorization (step 230). Alternatively, the payment validator 130 could authorize or deny the electronic payment request based on the user stating his name and comparing it to the voice print. In yet another embodiment, a user will receive a call that plays an audio cue, such as "cha-ching," indicating the call is an electronic payment call followed by a brief challenge phrase which the user repeats.

In one embodiment, the payment validator 130 requests the user 90 to repeat a challenge phrase comprising a series of numbers or words or any combination thereof, e.g., please repeat 3-7-2-9, 3-7-2-9" (steps 242 and 244). If the user 90 wants to proceed with the authorization, the user 90 must repeat the challenge phrase, i.e., the user 90 would repeat 3-7-2-9, 3-7-2-9 (step 246). The user device 100 transmits the repeated challenge phrase to the payment validator 130 as it would any other voice call. The challenge phrase repeated by the user 90 is herein referred to as the identity claim utterance. The identity claim utterance may comprise the entire challenge phrase or a just a segment of the challenge phrase. In some embodiments, the identity claim utterance does not use the exact wording or numbers as the voice print. For example, with each electronic payment validation, the payment validator 130 may generate a separate pseudorandom sequence of numbers for the user 90 to repeat. In other embodiments, however, the identity claim utterance does use the exact wording or numbers as the voice print. That is, if the user 90 enrolls his name as the voice print during the initial registration process, e.g., John Doe, the payment validator 130 would request the user 90 to say his name as the identity claim utterance. After the payment validator 130 captures the identity claim utterance transmitted from the user device 100, it compares the identity claim utterance to the voice print to provide an authentication or a non-authentication of the user 90.

In other words, using biometric technology, the payment validator 130 compares the identity claim utterance to the voice print to determine if the same person is the speaker of both the identity claim utterance and the voice print (step 248). If the payment validator 130 determines that the same person is the speaker of both the identity claim utterance and the voice print, the payment validator 130 provides an authentication of the user 90. That is, the payment validator 130 indicates that the person requesting the electronic payment transaction is authorized to do so. If, however, the payment validator 130 determines that the same person is not the speaker of both the identity claim utterance and the voice print, the payment validator 130 provides a non-authentication of the user (step 250). That is, the payment validator 130 indicates that the person requesting the electronic payment transaction has not been authenticated as one authorized to execute the transaction. This functionality can even be included in a separate module such as an authentication module.

Based on the authentication or non-authentication, the payment validator 130 either approves or denies the electronic payment transaction. In other words, if the payment validator 130 provides an authentication of the user 90 (indicating the user 90 is the speaker of both the identity claim utterance and the voice print), the payment validator 130 then approves the electronic payment transaction. If, however, the payment validator 130 provides a non-authentication of the user 90 (indicating the user 90 is not the speaker of both the identity claim utterance and the voice print), the payment validator 130 then denies the electronic payment transaction. Upon authentication in this exemplary embodiment, the payment validator 130 transmits the approval to the pump 120 and allows the user 90 to purchase gasoline. In this embodiment, the payment validator 130 also communicates to the user 90 via the user device 100 whether the electronic payment transaction is authorized or denied (step 240). For example, if the payment validator 130 approves the electronic payment transaction, the payment validator 130 communicates the voice message "your electronic payment transaction has been authorized; thank you, goodbye." Similarly, if the payment validator 130 denies the electronic payment transaction, the payment validator 130 communicates the voice message "we're sorry, your electronic payment transaction has been denied; thank you, goodbye." In practice, any message desired can be communicated to the user 90 to indicate the electronic payment transaction has been approved or denied. Moreover, the payment validator 130 can return the authentication result to the point-of-sale where further payment authorization can occur. For example, following receipt of a non-authentication result from the payment validator 130, a person at the point of sale may require identification to authorize the electronic payment transaction, e.g., driver license or identification card. Similarly, a device could also provide this functionality by, for instance, requiring the user to swipe his credit card and type in his zip code at the gas pump. In essence, if a user is not authenticated, an alternative is provided to authorize the transaction.

If the payment validator 130 approves the transaction, the payment validator 130 then bills the user 90 for the electronic payment transaction (step 260). The term "bills" the user is used generically. For example, in one embodiment, the payment validator 130 bills the user's cell phone or wireless data services account for the amount of the electronic payment transaction. That is, the user 90 would receive an itemized bill listing the charged electronic payment transactions along with his monthly cell phone or wireless data services bill. In another embodiment, the payment validator 130 charges the user's 90 credit card for the amount of the electronic payment transaction. In a third embodiment, the payment validator 130 withdraws the funds from the user's 90 checking or savings account for the amount of the electronic payment transaction. In another embodiment, the payment validator 130 forwards the electronic payment transaction information to any number of pre-arranged third parties for billing. As should be recognized, there are many ways in which the payment validator 130 could bill the customer for the electronic payment transaction without deviating from the scope of the various embodiments.

Exemplary methods, systems, and computer program products provide the user 90 with an electronic wallet. That is, the user 90 can use a mobile device as an electronic wallet using his or her voice for the authentication. The user 90 cab then be billed for the electronic payment transaction. Moreover, virtually anything can be configured to communicate with the system and provide the user 90 with the ability to purchase goods and services using the device. For instance, users shopping via the Internet, at shopping malls, or any location with facilities for accepting electronic payments can use the described methods, systems, and computer program products.

In the preceding specification, various embodiments have been described. It will, however, be evident that various modifications and changes may be made thereunto without departing from the broader spirit and scope of the embodiments as set forth in the claims that follow. The specification and drawings are accordingly to be regarded in an illustrative rather than in a restrictive sense.

That which is claimed:

1. A method comprising:
    storing, by a payment validator, a voice print of a user uttering a first content, wherein the payment validator comprises at least one processor and at least one memory;
    receiving, by a payment validator, information relating to an identity token from a device of the user;
    in response to receiving the information, receiving, by the payment validator, an electronic payment transaction request from the user device;
    establishing a voice link between the payment validator and the user device directly in response to the electronic payment transaction request via the payment validator, wherein the establishing the voice link comprises the payment validator calling the user device;
    generating, by the payment validator, a pseudo-random sequence, and transmitting the pseudo-random sequence over the voice link, wherein the generated pseudo-random sequence is substantially different from the first content;
    receiving, by the payment validator, from the user, via the user device, over the voice link, an utterance, by the user, of the generated pseudo-random sequence;
    comparing, by the payment validator, the user's utterance of the generated pseudo-random sequence to the voice print of the user uttering the first content; and
    authorizing, by the payment validator, the electronic payment transaction based on the comparison.

2. The method of claim 1 further comprising:
    billing the user for the electronic payment transaction if the electronic payment transaction is
    authorized following the comparison.

3. A non-transitory computer-readable storage medium carrying one or more instructions which, when executed by a processor, cause an apparatus to at least perform the following steps:
    storing, by a payment validator, a voice print of a user uttering a first content, wherein the payment validator comprises at least one processor and at least one memory receiving, by a payment validator, information relating to an identity token from a device of the user;
    in response to receiving the information, receiving, by the payment validator, an electronic payment transaction request from the user device;
    establishing a voice link between the payment validator and the user device directly in response to the electronic payment transaction request via the payment validator, wherein the establishing the voice link comprises the payment validator calling the user device;
    generating, by the payment validator, a pseudo-random sequence, and transmitting the pseudo-random sequence over the voice link, wherein the generated pseudo-random sequence is substantially different from the first content;
    receiving, by the payment validator, from the user, via the user device, over the voice link, an utterance, by the user, of the generated pseudo-random sequence;
    comparing, by the payment validator, the user's utterance of the generated pseudo-random sequence to the voice print of the user uttering the first content; and
    authorizing, by the payment validator, the electronic payment transaction based on the comparison.

4. The computer-readable storage medium of claim 3, wherein the instructions are further executable for performing:
    billing the user for the electronic payment transaction if the electronic payment transaction is authorized following the comparison.

5. A system comprising:
    a payment validator comprising a processor configured for and memory storing executable instructions that when executed by the processor causes the processor to perform the steps of:
    storing a voice print of a user uttering a first content;
    receiving information relating to an identity token from a device of the user;
    receiving an electronic payment transaction request from the user;
    establishing a voice link between the payment validator and the user device directly in response to the electronic payment transaction request, wherein the establishing the voice link comprises the payment validator calling the user device;
    generating a pseudo-random sequence, and transmitting the pseudo-random sequence over the voice link, wherein the generated pseudo-random sequence is substantially different from the first content;
    receiving, from the user, via the user device, over the voice link, an utterance by the user, of the generated pseudo-random sequence;
    comparing the user's utterance of the generated pseudo-random sequence to the voice print of the user uttering the first content; and
    authorizing the electronic payment transaction based on the comparison.

6. The system of claim 5, wherein the memory further comprises instructions that when executed by the processor, causes the processor to perform the step of:
    billing the user for the electronic payment transaction if the electronic payment transaction is authorized following the comparison.

* * * * *